Feb. 26, 1957 J. J. JAKOSKY 2,782,865
METHOD OF GEOPHYSICAL EXPLORATION
Filed May 6, 1952 2 Sheets-Sheet 1

Percent of total energy falling within Spread Circle

INVENTOR
JOHN J. JAKOSKY
BY

ATTORNEYS

Feb. 26, 1957  J. J. JAKOSKY  2,782,865
METHOD OF GEOPHYSICAL EXPLORATION
Filed May 6, 1952  2 Sheets-Sheet 2

INVENTOR
JOHN J. JAKOSKY
BY
*Mason & Graham*
ATTORNEYS

2,782,865
METHOD OF GEOPHYSICAL EXPLORATION

John J. Jakosky, Los Angeles, Calif., assignor, by direct and mesne assignments, of forty percent to International Geophysics, Inc., Los Angeles, Calif., a corporation of California, and sixty percent to Signal Oil and Gas Company, a corporation of Delaware Application May 6, 1952, Serial No. 286,391

6 Claims. (Cl. 181—.5)

My invention has to do with improvements in the art of geophysical exploration by reflected seismic waves.

Generally speaking, seismic prospecting involves creating, by an explosive, seismic waves which are reflected from subterranean stratum to wave detecting and recording apparatus at the ground surface.

Conventional detecting and recording apparatus includes a multiplicity of electrical detectors or geophones, a precision timing device, and galvanometer type oscillographs each disposed so that a light beam reflected on each galvanometer mirror records the ground motion at the various geophone locations on a uniformly moving strip of photosensitive paper. From such a chart recording ground motions and time, a geophysicist can form a dependable opinion as to the nature of the subterranean strata.

It is a principal aim of those working in the art to obtain, at minimum cost, the maximum seismic signal/interference ratio (signal/noise ratio) at the recording instruments. This is to enable full amplification efficiency of the recording equipment and to minimize the filtering required to produce that result. However, there are various factors which are conducive to defeating those aims.

One of those factors is the variable characteristics of a near surface, relatively unconsolidated, low velocity layer extending downwardly from the ground surface. This layer varies in depth from about 25 feet to several hundred feet and is referred to as the "weathered zone" or "weathered layer," although this zone often does not exhibit weathered characteristics throughout its depth.

Another factor consists of the varying characteristics of reflecting strata.

Other factors are the interference caused by the air waves at the ground surface and by disturbances of the recording instruments caused by ground roll, which is a low frequency disturbance traveling parallel to the air-ground interface and generated by the coupling of energy between the air and ground waves.

While it has been recognized that the best seismic signal/interference ratio and the best transfer of energy through the weathered zone are obtainable when the predominant frequency band of the shock wave spectrum is coordinate with the optimum frequency band of the reflected waves and of the weathered zone, depending to some extent upon the relative magnitude of the wave length and the bed thickness, previous attempts to obtain shock waves which, at the ground surface, produce a spectrum whose predominant frequencies are within the desired band have not only been costly but have tended to defeat the end of obtaining proper reflected signal energy at the recording apparatus.

For instance, it has been proposed to place a seismic wave producing source at a position elevated above the ground a distance equal to or greater than the depth of the reflecting stratum, the desired end being to produce substantially a plane wave at the ground surface. However, the placement of the explosive at such high elevations has serious drawbacks: a much greater quantity of propellant is required to raise the projectile to the required height, which greatly increases the dangers of premature explosion; the cost is relatively great; the signal strength is inadequate, and generally decreased accuracy results. The latter item becomes of increasing importance as the wind and atmospheric conditions become more unfavorable, requiring elaborate corrections and compensations for drift and wind.

From a practical standpoint, therefore, it is apparent that the height of the explosion should be kept as low as possible, but heretofore, when that has been attempted, the frequency spectrum has contained many prominent high energy bands that were not coordinated with the optimum reflected frequency band or the optimum frequency band of the weathered zone, with resultant low signal/interference ratio and useless records.

Another procedure which has been proposed has been that of placing at fixed elevations above the ground, ranging from 5 to 15 feet, a group of explosives arranged in a special pattern, the aim being to produce shock waves of supersonic frequency and presumably having directional properties. Such a procedure might have certain theoretical advantages which would possibly apply if all the conditions encountered in practice could fulfil the theoretical assumptions. However, due to the large lateral and vertical variations in the near-surface beds, especially in the unconsolidated layer, almost any theoretical placement of charges in a pattern is doomed to failure when applied in practice. As a result, the seismic records using such a technique are extremely spotty in their appearance, and their resolving power, when an extended survey is conducted over the usual area of economic size, is far from being the ideal type that would be predicted by theory. Also, such a technique requires considerable time for setting up the pattern of charges, usually 13 charges being positioned on stakes spaced in a definite, surveyed, geometric pattern. Inasmuch as the average charge is about 10 pounds of explosive for each bomb, 130 pounds are required for the pattern.

The most conventional method used in seismic exploration involves firing explosive charges in bore-holes in the earth, known as shot-holes, varying in depth from 25 feet to several hundred feet—the aim being to have the shot-holes deep enough to place the explosion below the weathered layer. However, the drilling of shot-holes is expensive, and when the explosive is so placed, the frequency spectrum of the explosion is distributed in bands which cover a wide range, from ultrasonic to subsonic frequencies, with the major portion of the energy concentrated in a frequency range which is very much broader than will be transmitted to the geophones along the reflection path. A frequency analysis of the reflections from different depths by means of a harmonic wave analyzer shows an actual decrease in the frequency having the maximum energy because the absorption coefficient is greater for higher frequencies.

It is among my objects to provide a method by which it is possible, at a minimum cost, to obtain, at the recording instrument, a high seismic signal/interference ratio.

It is another object to provide a method of correlating the effective frequency band of an explosion in the air to the optimum frequency band, a harmonic, or a sub-harmonic of the reflected seismic waves.

It is another object to provide a novel method of correlating the effective frequency band of an explosion in the air to the frequency band, a harmonic, or a sub-harmonic which will insure maximum transfer of energy through the subsurface weathered zone.

A still further object is to provide a method by which the velocity and depth characteristics of the subsurface weathered zone may be determined coincidently with the firing of the propellant charge by which the explosive projectile is propelled upwardly from the ground and to record the seismic waves reflecting said characteristics upon the main seismic chart.

Another object is to provide a method by which disturbances of the recording apparatus due to air waves resulting from the explosion are minimized.

A more specific aim is to coordinate the shock wave to the optimum frequency band of the reflected seismic waves by predesigning an explosive projectile to produce a frequency spectrum whose predominant frequencies at the instant of explosion is of a known higher frequency band and to modify the effective band of frequencies which strike the earth by controlling the speed and height of the projectile at the instant of explosion.

Other objects and corresponding advantages will become apparent to those skilled in this art from the following description wherein, for purposes of explaining my invention, I describe particular practices thereof and specific apparatus therefor, for which purpose I shall refer to the accompanying drawings wherein.

Figure 1:
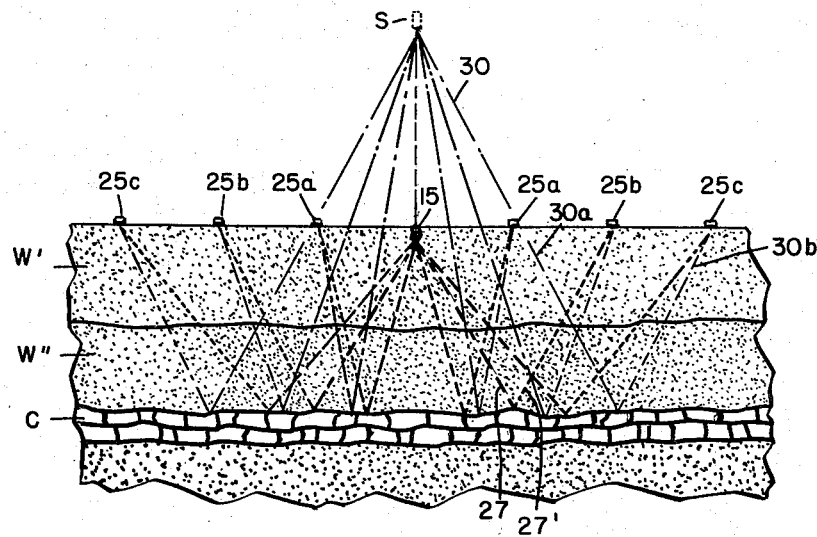
Fig. 1 is a section of the earth showing a pattern of incident and reflected waves.

In general, I achieve my aims by exploding, at a predetermined height above the ground, an upwardly moving projectile predesigned to create an impulse whose major energy is within a known higher frequency band and, by controlling the speed of the projectile at the moment of explosion, I modify the effective frequency band of the major energy components of the impulse before the shock wave strikes the ground, to a band of effective frequencies, harmonics or subharmonics thereof which are within the optimum frequency band of the reflected waves and to allow optimum signal/interference characteristics. By this procedure I am able to obtain a shock wave having a high percentage of available energy as well as to coordinate the frequency band to the optimum desired. I also determine the depth and velocity characteristics of the weathered layer coincidently with the firing of the charge which propels the projectile upwardly from the ground by recording the seismic waves created by that charge and refracted through the weathered and subweathered stratum.

First, I determine empirically the frequency band of the reflected waves which is optimum for the particular area being explored, as well as the frequency band which will allow maximum energy transfer through the weathered zone. This is done by making a few test aerial explosions, recording the seismic waves reflected from some of the reflecting stratum and determining the effective frequency band of those waves by reference to the time interval between contiguous peaks.

I have found that the most effective transfer of energy and the best signal/interference ratio is attained when the frequency, a harmonic or a subharmonic of the effective energy band in the explosive wave striking the ground is approximately that of the frequency of the reflected energy; i. e., if the reflected energy lies preponderantly in a band 35 to 45 cycles wide, the seismic shock energy, its harmonic or subharmonics, when it strikes the surface of the ground, should also lie in that band. This band will of course vary for different areas. For instance, in certain parts of the Cuyama Valley of California, where the weathered zone has a thickness of 400 feet or more, the maximum energy can be transmitted when the shock frequencies lie within a band extending from 25 to 35 cycles. In some portions of the Edwards plateau and Delaware basin areas of Texas, where the harder rocks and caliche extend to or close to the surface, the best transfer of energy is obtained when the major shock components lie within a band from 40 to 50 cycles. Generally, the deeper the weathering and the less dense the near surface materials, the lower is the effective peak frequency.

Having determined the optimum frequency band of the reflections, I then design a projectile containing an explosive charge which, at the instant of explosion, will produce an impulse whose predominant effective frequencies are above the optimum desired. As will be hereinafter explained, the nature and extent of the charge will depend upon (1) said optimum reflected wave frequency band, (2) the height of the explosion, and (3) the upward speed of the projectile at the instant of the explosion; it being my aim to employ the Doppler effect and the filtering action of the air to an extent which will result in the shock wave having, at the time it strikes the ground, a frequency spectrum whose predominant or effective frequencies are within the optimum reflected wave frequency band, its harmonics or subharmonics.

The frequency spectrum generated by the aerial bomb at the time of explosion is governed by the characteristics of the explosive. The steeper the wave front of the explosive the greater the percentage of the higher frequency components in the explosion. A 100 percent blasting gelatin generates a steeper wave front and more higher frequency components than an FF blasting powder. The steeper wave front induces a greater shock wave in the air, which in turn induces a greater percentage of available seismic energy when the wave strikes the ground. It is therefore my preference to employ a steep wave front type of explosive and to control the frequency in the manner hereinafter described.

Figure 3:
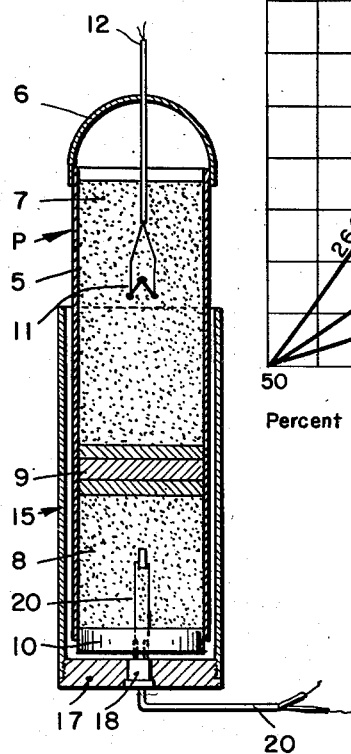
Fig. 3 is a sectional view of a projectile mounted within a mortar.

In Fig. 3 I illustrate a preferred projectile P. Here the projectile comprises a shell or casing 5, a cap 6, an explosive charge 7, a propellant charge 8, cushioning 9 between the two charges and the lower end is fired by a squib 10. A detonating cap 11 is embedded in the charge 7 and has electrical circuit wires 12 which lead to a remote firing mechanism at the ground, as will be hereinafter described. The projectile is mounted in the mortar 15, which has an end wall 17 threadedly mounted therein, and carries an electrical plug 18 which is plugged into the squib. Circuit wires 20 lead from the plug to the detonating mechanism to be described.

Figure 2:
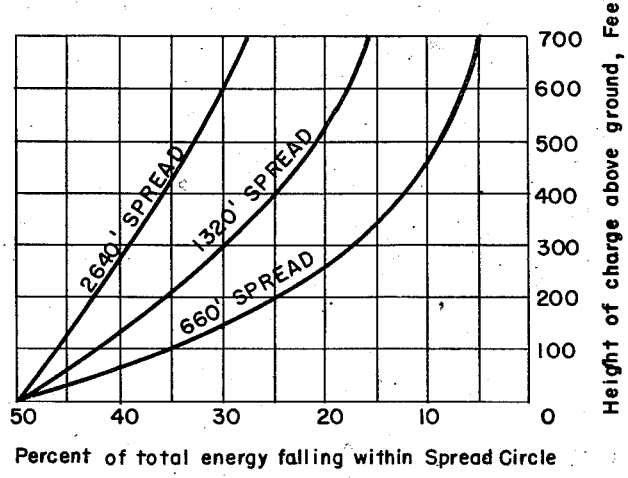
Fig. 2 is a graph.

In order to obtain the maximum signal/interference ratio, the height of the explosion should be kept as low as may be possible commensurate with preventing, or holding to a minimum, disturbing air waves and ground roll at the end of the spread. The graph shown in Fig. 2 illustrates the general relationship between the height of the explosion and the percentage of useful energy striking the surface of the ground within various geophone spread circles, namely 660 feet, 1320 feet and 2640 feet—a spread circle being defined by its diameter and whose axis is defined by the location of the mortar 15. The curves show the percentage of energy falling within a circle having a diameter equal to the seismograph spread and centered directly underneath the shot point, as determined by the following equation:

$$\text{Percent energy } E = 50\left[1 - \frac{h}{\sqrt{h^2 + S^2}}\right]$$

$S$=Spread; 660′, 1320′ and 2640′.
$h$=Height of charge above ground.
$E$=Percent of energy released by explosion which falls within geophone spread, neglecting attenuation by air.

Air waves created by an aerial explosion will create a disturbing ground roll unless there is a constant change in the component of velocity parallel to the surface of the ground within the area of the seismograph spread. A shock wave containing a broad spectrum of frequencies emanating from a shot-point and traveling radially outwardly in the air will couple energy to the ground continuously, and, in general, there will be a build-up of certain energy waves in the ground because some of the energy coupled to the ground at a given point will be in phase with the ground wave resulting from energy previously coupled into the ground at another point closer to the shot-point.

In ordinary in-hole shooting and in air shooting where the explosive is placed close to the surface of the ground, the air wave travels substantially parallel to the ground, coupling into the ground all the frequencies in its spectrum. If the ground phase velocity corresponding to any one of those frequencies is equal to the velocity of the air wave, then this frequency component of the air and ground waves will be continuously in phase, the ground wave will be continuously reinforced by the air wave and ground roll will result and obscure the record. In the practice of my invention the situation is different, the energy being released by an explosive charge a given distance above the ground. This energy travels radially from the shot-point and only a component of the released energy travels parallel to the air-ground interface. This velocity component, $V_x$, parallel to the interface may be expressed as:

$$V_x = V_T \left[ \frac{x}{\sqrt{h^2 + x^2}} \right]$$

where:

$x$ is horizontal distance from shot-point to the point of observation, $h$ is height of charge above ground, and $V_T$ is the radial velocity of the sound in air.

An examination of this equation will show that $V_x$ changes continuously with $x$, as long as $x$ is of the same order of magnitude as $h$ (when $x$ becomes very large, $V_x$ reduces to $V_T$).

The energy coupled in the ground at each point will in general "resonate" at a frequency which depends upon $x$, the distance of the point from the origin underneath the explosion. In other words, the energy coupled to the ground at C will reinforce only those frequencies previously coupled to the ground at 0 which correspond to the ground velocity, $$V_x = V_T \left[ \frac{OC}{\sqrt{OC^2 + h^2}} \right]$$

while at point E only the frequencies corresponding to $$V_x = V_T \left[ \frac{OE}{\sqrt{OE^2 + h^2}} \right]$$

will be reinforced; all other frequencies at these points will be canceled out or diminished in magnitude. Since the reinforced frequency will be different for each value of $x$ (until $x$ becomes much larger than $h$), no build up energy of any particular frequency can take place.

In the practice of my invention, it is my preference to utilize the Doppler effect in controlling the frequency by having the explosion take place while the bomb is moving at a selected velocity.

The speed at which the rocket or bomb is moving at the instant of the explosion is governed by (1) its initial ejection speed and (2) the time at which the explosion occurs.

The ejection speed may be controlled by the propelling charge when the projectile is ejected from the mortar. The initial velocity is the greatest, and this velocity gradually decreases as the rocket ascends due to the decelerating effect of gravity. By controlling the time of explosion, the height of the rocket and its speed may be selected—for a given design and propellant charge.

The change in velocity with time for a bomb projected from a mortar may be expressed by the relationship:

$$V_t = V_i - (gt)$$

where:

$V_i$ = initial velocity
$V_t$ = velocity at a given time
$g$ = acceleration due to gravity
$t$ = time after initial ejection from mortar The effect of velocity of the bomb upon the frequency may be expressed as follows:

$g$ = constant = 32.2 ft./sec.$^2$ $\lambda$ = wavelength in air, ft./sec. = $vt = \dfrac{v}{n}$ $V$ = velocity of travel upward of the rocket, at the instant of explosion
$v$ = velocity of sound in air = 1080 ft./sec.
$n$ = frequency, cycles per second For example, when the projectile is ascending at the time of the explosion, although the actual frequency $n$ of the explosion itself is unchanged $n'$, the number of vibrations per second reaching the surface of the ground is decreased, and may be expressed as follows:

$$n' = \frac{v}{\lambda'}$$

$$\frac{n'}{n} = \frac{\dfrac{v}{\lambda'}}{\dfrac{V+v}{\lambda'}} = \frac{v}{V+v}$$

$$n' = \frac{nv}{V+v}$$

As an illustration, let
$v = 1080'$/sec.
$V = 800'$/sec.
$n = 100$ cycles/sec.

$$n' = \frac{nv}{V+v} = \frac{100 \times 1080}{800 + 1080} = \frac{10800}{1880} = 56 \text{ C. P. S.,}$$ and the first subharmonic will be 28 C. P. S.

From the preceding paragraphs it can be seen that a relationship exists between the predominant frequency emitted by the explosion and the speed of its travel at the instant of explosion. When rockets are employed emitting preponderantly higher frequencies, they should be traveling upward at a much higher speed than would be necessary for rockets emitting lower frequencies.

From the foregoing procedures it will be possible to determine the explosive charge, the height of explosion and the speed of the projectile at the time of explosion to produce at the ground surface a shock wave of the desired frequency band. By way of example, it was found that in one area of the Delaware Basin the desired or optimum reflected wave frequency is of the order of 56 cycles. A spread length of 1320 feet was used and the optimum height of the explosion was found to be 135 feet to prevent interfering ground coupling, and the optimum speed of travel of the projectile at the time of explosion was found to be 800 feet. The projectile contained approximately 8 pounds of 100 percent blasting gelatin.

After experimentally determining the foregoing elements, I firmly anchor the mortar 15 in a shallow bore hole in the ground—say, of 4 feet in depth—and arrange conventional seismometers in alignment at opposite sides of the mortar. The number of seismometers in each group and their spacing will determine the seismometer spread and this will govern the height at which the explosion shall occur. Merely as an example, I show three seismometers 25a, 25b, 25c in each group, making six in all. According to my method, I position the seismometers 25a, which are nearest the mortar, at a distance from the mortar which is less than four times the estimated probable depth of the weathered zone W; and I place the seismometers 25c, which are farthest from the mortar, at a distance which is greater than four times the estimated probable depth of the weathered zone. For instance, in Fig. 1 the depth of the weathered zone W will be assumed to be 50 feet; the spacing of the nearest seismometers 25a from the mortar is 100 feet, and the distance of the farthest seismometer 25c from the mortar is 300 feet. The seismometers of each group are in alignment with each other and with those of the other group and are preferably equidistantly spaced apart. The projectile P is then placed in the mortar and the propellant charge 8 electrically fired to propel the projectile vertically upwardly to the shot-point S, where it will be exploded. To ignite the propellant charge, the squib 10 is fired by the electrical circuit 20 and the explosive charge 7 is detonated by the cap 11 through circuit wires 12, in the manner to be hereinafter described.

When the propellant charge is thus fired, seismic waves 27 will be created, which waves will be reflected through the consolidated stratum C, being recorded by the seismometers as reflected waves 27'.

Figure 4:
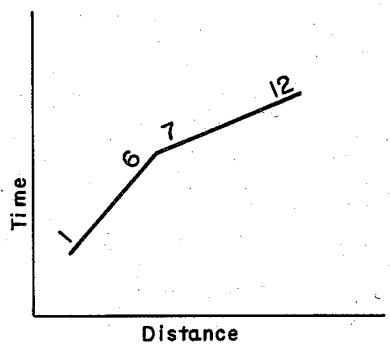
Fig. 4 is another graph.

The zone illustrated comprises a weathered and relatively unconsolidated zone W', as well as an underlying relatively more consolidated zone W'', there being a sloping interface between those zones. Due therefore to the different densities of those zones, they possess different velocity characteristics, the more consolidated zone W'' having greater velocity than zone W'. The change from zone W'' to zone W' will be clearly indicated by the change or break in the slope of the plot of the arrival time at the respective seismometers versus their respective distances from the mortar, as illustrated in Fig. 4, wherein the seismometer spread includes 12 seismometers and wherein the numerals "1," "6," "7" and "12" denote the seismometers of those respective positions in alignment from the mortar. From this chart may be determined the velocities and depths of the zones W' and W''.

The projectile is then exploded at the predetermined height and speed, producing sound waves 30' whose major energy frequency spectrum is within a relatively high frequency band. By the Doppler effect, aided by the filtering action of the air, the effective frequency band of those waves will be so modified by the time they strike the ground surface as to produce incident seismic waves 30a of a predominant frequency within the optimum frequency band or a harmonic of the reflected seismic waves 30b. While not shown in the drawing, there will of course be some refraction of the waves at the air-ground interface.

By operating the recording tape in the seismometers continuously from an instant before the mortar shot to the time of the arrival of the last reflected wave of economic interest at the seismometers, there may be combined on the chart the data relating to the depth and velocities of the zones W' and W'' as well as the contour of the reflecting stratum C.

Proper control of the point of explosion of the projectile constitutes a problem in seismic prospecting by aerial shooting, particularly when that point is critical as in my method. Experience has shown that time-delay detonators are not generally practicable where the height is critical because they usually vary from 10 percent to 25 percent in their rated values, and often there are variations in the velocity of the projectile as it leaves the mortar of from 5 percent to 15 percent.

Figure 5:
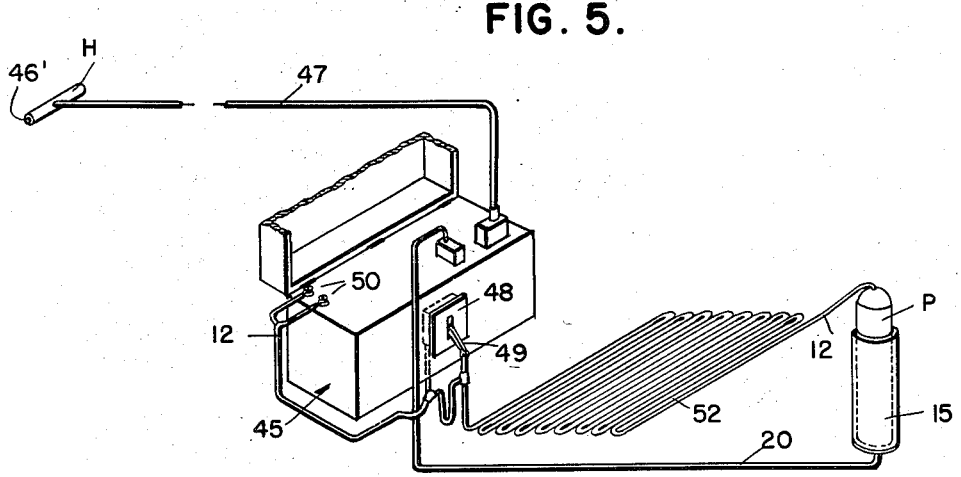
Fig. 5 is a perspective showing apparatus for controlling the height of explosion of a projectile.

In order to be able positively to control the point of the explosion, I provide a firing system as schematically illustrated in Fig. 5.

Figure 6:
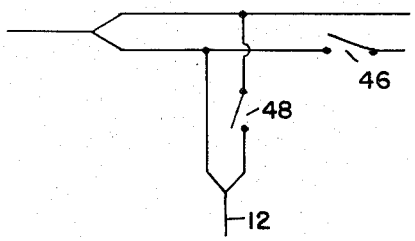
Fig. 6 is a wiring diagram of the apparatus of Fig. 5.

Here the squib 10 in the projectile is connected by leads 20 to a disconnect plug in the firing box 45, the circuit of which is arranged to be closed by closing switch 46 (Fig. 6), which is accomplished by pressing a pair of buttons 46' (one not shown) in opposite ends of handle H of the firing cable 47. Also connected into the circuit is a control switch 48 having a trip lever 49. The switch controls the circuit to terminals 50 to which leads 12 are connected—the latter leads being connected to the detonating cap 11 in the projectile P. The length of the lead 12 is equal to the desired distance between the ground surface and the shot-point S, the lead being arranged in an accordion fold 52. Operation is as follows: When the control circuit is closed, the squib 10 ignites the propelling charge 8, causing the projectile P to be propelled upwardly. Upon reaching the desired height (shot-point S) the lead length 12 will become spent and the upward movement of the projectile will, through the lead 12, operate automatically to trip lever 49 to close the firing circuit to the detonating cap 11, causing the projectile to be exploded at the desired height.

I claim:

1. In seismic exploration, the method of making records from which characteristics of subterranean strata may be determined, which comprises creating at the earth's surface a first explosion impulse, creating above the earth's surface a second explosion impulse at a predetermined distance and time interval from said first explosion impulse, and sequentially recording at horizontally spaced aligned points along the earth's surface the resultant seismic waves created by said respective explosion impulses and the seismic waves reflected from said strata.

2. In the art of seismic geophysical exploration of earth stratum, the method of producing a chart of seismic waves reflected from said stratum, which comprises propelling a projectile upwardly from the ground surface by exploding adjacent the ground surface a propellant charge, subsequently exploding said projectile at a height above the ground surface, and sequentially recording in linear relation upon a moving tape the seismic waves resulting from said respective explosions.

3. In the art of charting subterranean stratum by reflecting seismic waves therefrom through an overlying earth zone, the method which comprises the steps of providing an explosive charge which, upon explosion, will produce an impulse the frequency spectrum of whose major energy components is above the frequency band of seismic waves which can be reflected from said stratum through said zone with maximum energy, moving said charge upwardly away from the earth surface, exploding said charge while it is moving upwardly away from said surface at a predetermined speed such that the Doppler effect will cause the frequency spectrum of the major energy components of said impulse to be modified, by the time the shock wave of said impulse reaches said earth surface, to a frequency spectrum within said band, and recording the arrival at spaced points along the earth surface of the resultant seismic waves reflected from said stratum.

4. In the art of charting subterranean stratum by reflecting seismic waves therefrom through an overlying earth zone, the method which comprises the steps of producing a test explosion at a point overlying said stratum, detecting the arrival at the earth surface of the resultant seismic waves reflected from said stratum and selecting from said detections the frequency band of waves arriving at said earth surface with maximum seismic signal interference ratio, providing an explosive charge having a wave front which upon being exploded will produce an impulse whose major energy components are within a frequency spectrum above that of said band, controllably propelling said charge upwardly into the air above said zone, exploding said charge during its upward movement at a predetermined speed which will, by virtue of the Doppler effect, cause the frequency spectrum, the harmonics and subharmonics, of said major energy components to be modified to a frequency spectrum within said band by the time the shock wave of said impulse strikes the earth surface, and recording the arrival at spaced points along the earth of the resultant seismic waves reflected from said stratum.

5. In the art of charting subterranean stratum by reflecting seismic waves therefrom through an earth zone overlying said stratum, the method which comprises the steps of first determining the frequency band of waves which can be reflected through said zone with maximum energy, providing an explosive charge which, upon being exploded, will produce an impulse the frequency spectrum of whose major energy components is above said band, providing a propellant charge for said explosive charge, exploding said propellant charge substantially at the earth surface to propel said explosive charge upwardly into the air above said zone, recording the arrival at spaced points along the earth surface of the seismic waves resulting from exploding said propellant charge and reflected from said stratum, creating said impulse by exploding said explosive charge during its upward movement at a predetermined speed which, by virtue of the Doppler effect, will cause the frequency spectrum, the harmonics and subharmonics of the major energy components of said impulse to be modified to a spectrum within said band by the time the shock wave of said latter explosion strikes the earth surface overlying said zone, and recording the arrival at spaced points along the earth surface of the seismic waves resulting from said impulse and reflected from said stratum.

6. In the art of charting subterranean stratum by reflecting seismic waves therefrom through an overlying earth zone, the method which comprises the steps of symmetrically arranging a spread of seismic wave detectors at relatively spaced points along the earth surface overlying said zone, determining the frequency band of seismic waves which can be reflected from said stratum through said zone to said detectors with maximum energy, providing an explosive charge which, upon being exploded, will produce an impulse the frequency spectrum of whose major energy components is above said band, moving said charge upwardly away from a point at the earth surface centrally of said spread of detectors, exploding said charge at a predetermined height only just enough to create an air wave having a horizontal component of continuously changing velocity within the spread length of said detectors and while said charge is traveling upwardly at a predetermined speed such that the resulting Doppler effect will cause the frequency spectrum, the harmonics and subharmonics of the major energy components of said explosion to be modified, by the time the shock wave of said explosion strikes the earth surface, to a frequency spectrum within said band, and recording the arrival at spaced points along the earth surface of the resultant seismic waves reflected from said stratum.

References Cited in the file of this patent

UNITED STATES PATENTS

| | | |
|---|---|---|
| Re. 17,242 | McCollum | Mar. 19, 1929 |
| 1,181,190 | Welton | May 2, 1916 |
| 1,235,637 | Barlow | Aug. 17, 1917 |
| 1,340,546 | Keeran | May 18, 1920 |
| 2,148,422 | Blau | Feb. 28, 1939 |
| 2,247,111 | Batchelor et al. | June 24, 1941 |
| 2,379,203 | Vertzinsky | June 26, 1945 |
| 2,615,521 | Poulter | Oct. 28, 1952 |